United States Patent
Yoshizaki

(10) Patent No.: US 7,585,338 B2
(45) Date of Patent: Sep. 8, 2009

(54) HYDROGEN GENERATING APPARATUS

(76) Inventor: Atuhiro Yoshizaki, 1469-1, Tabiko, Hitachinaka-shi, Ibaraki 312-0063 (JP)

( * ) Notice: Subject to any disclaimer, the term of this patent is extended or adjusted under 35 U.S.C. 154(b) by 648 days.

(21) Appl. No.: 11/038,106

(22) Filed: Jan. 21, 2005

(65) Prior Publication Data
US 2006/0165568 A1      Jul. 27, 2006

(51) Int. Cl.
*B01J 7/00* (2006.01)
(52) U.S. Cl. ............ 48/61; 422/209; 422/105; 422/211; 422/222; 422/242; 422/228; 422/225; 204/252; 204/263; 123/3; 429/19; 429/43; 429/17; 423/658.2
(58) Field of Classification Search .............. 48/61; 422/198; 423/295
See application file for complete search history.

(56) References Cited
U.S. PATENT DOCUMENTS 4,952,374 A * 8/1990 Baillie ................. 422/110

7,316,718 B2 * 1/2008 Amendola et al. ............ 48/61
2003/0157003 A1 * 8/2003 Machado et al. ........... 422/242
2006/0112635 A1 * 6/2006 Yang et al. ..................... 48/61

FOREIGN PATENT DOCUMENTS

JP      2002-080202      3/2002

* cited by examiner

*Primary Examiner*—Alexa Neckel
*Assistant Examiner*—Kaity V. Handal
(74) *Attorney, Agent, or Firm*—Antonelli, Terry, Stout & Kraus, LLP.

(57) ABSTRACT

Hydrogen is generated in a reactor, of a hydrogen generating apparatus, in which a catalyst is installed and the catalyst and a borohydride fuel are reacted. The hydrogen generating apparatus comprises a rotating disk to which the catalyst is fixed, a motor for rotating the rotating disk, and a fuel injector for flowing out the borohydride fuel against the catalyst. A compound generated from the borohydride is prevented from adhering to the catalyst.

12 Claims, 9 Drawing Sheets

HYDROGEN GENERATING APPARATUS

BACKGROUND OF THE INVENTION

The present invention relates to a hydrogen generating apparatus, and particularly relates to a hydrogen generating apparatus in which hydrogen is generated by reacting a borohydride fuel with a catalyst.

Recently, as a hydrogen storing material for storing hydrogen, which becomes a fuel of a fuel battery, there has been known a borohydride fuel, which is generated by dissolving a metallic complex compound of $NaBH_4$ and $KBH_4$, etc., in an alkali aqueous solution.

The borohydride fuel is an extremely stable hydrogen storing and supplying material and has a characteristic in which a large quantity of hydrogen is generated under a normal temperature and a normal pressure using a suitable catalyst.

For example, under a following reaction formula, $NaBH_4$ has an ability, when 100% reacted, to generate about 1 liter of hydrogen gas from 1 cc of a fuel of 40 wt %, and this fuel becomes a good fuel for storing hydrogen.

As a prior art technique for generating hydrogen from the borohydride fuel, there is a hydrogen generating apparatus, for example, in which the borohydride fuel is poured into a reactor (a reaction vessel, a processing vessel) in which the catalyst is provided in an interior portion thereof, and then hydrogen is taken out from the borohydride fuel. Such a hydrogen generating apparatus has been known in Japanese patent laid-open publication No. 2002-80202.

The reaction formula of $NaBH_4$ as the borohydride fuel is as follows.

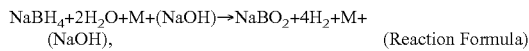

$$NaBH_4 + 2H_2O + M + (NaOH) \rightarrow NaBO_2 + 4H_2 + M + (NaOH),$$ (Reaction Formula)

wherein M is a catalyst of a noble metal group, such as platinum and palladium, ruthenium, and magnesium fluoride/nickel hydrogenation, which is made under a low cost and has a high performance hydrogen generating speed.

As stated above, one molecule of $NaBH_4$ and two molecules of water ($H_2O$) for constituting the aqueous solution are catalytically reacted and then hydrogen gas is generated.

Further, at the same time of the hydrogen gas generation, as shown in a right side of the above reaction formula, $NaBO_2$ is generated as a product of the reaction. After a recovery of $NaBO_2$ as a spent fuel, $NaBO_2$ is regeneratively processed to $NaBH_4$ and it can be used again as the fuel.

However, in the conventional hydrogen generating apparatus, for example, when $NaBO_2$ is generated at the same time as the generation of hydrogen from $NaBH_4$ as the borohydride fuel, there is a problem in which $NaBO_2$ adheres to the catalyst in the reactor, and thereafter the reaction slows and there occurs a danger that hydrogen is not taken out safely after a period of operation.

SUMMARY OF THE INVENTION

An object of the present invention is to provide a hydrogen generating apparatus wherein a harmful influence due to a reactive compound generated from a borohydride fuel adhering to a catalyst is prevented, and a stable operation is performed for a long period of time.

In a hydrogen generating apparatus according to the present invention, in which in a reactor for accommodating a catalyst, the catalyst and a borohydride fuel are reacted and hydrogen is generated, the hydrogen generating apparatus comprises a rotating body on which the catalyst is fixed, a rotation driving means for rotating the rotating body, and a fuel injecting means for blowing the borohydride fuel against the catalyst.

According to the hydrogen generating apparatus according to the present invention, the compound generated in the reaction forming hydrogen, which is generated in the reactor together with hydrogen, is centrifugally separated due to rotation of the rotating body.

DESCRIPTION OF THE INVENTION

First Embodiment

Next, a first embodiment of a hydrogen generating apparatus according to the present invention will be explained referring to the figures.

Figure 1:
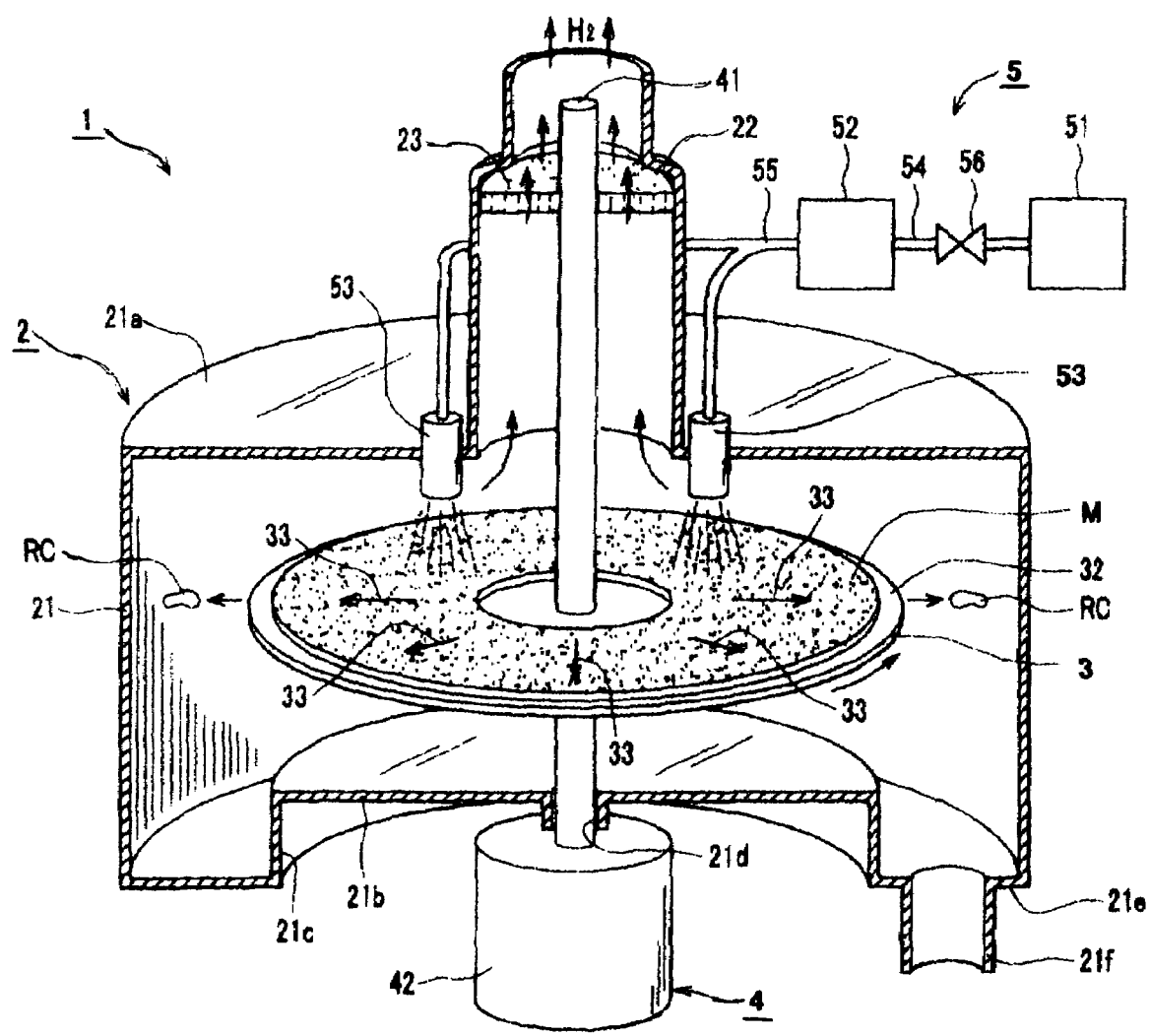
FIG. 1 is a respective view showing a first embodiment of a hydrogen generating apparatus according to the present invention.
Figure 2:
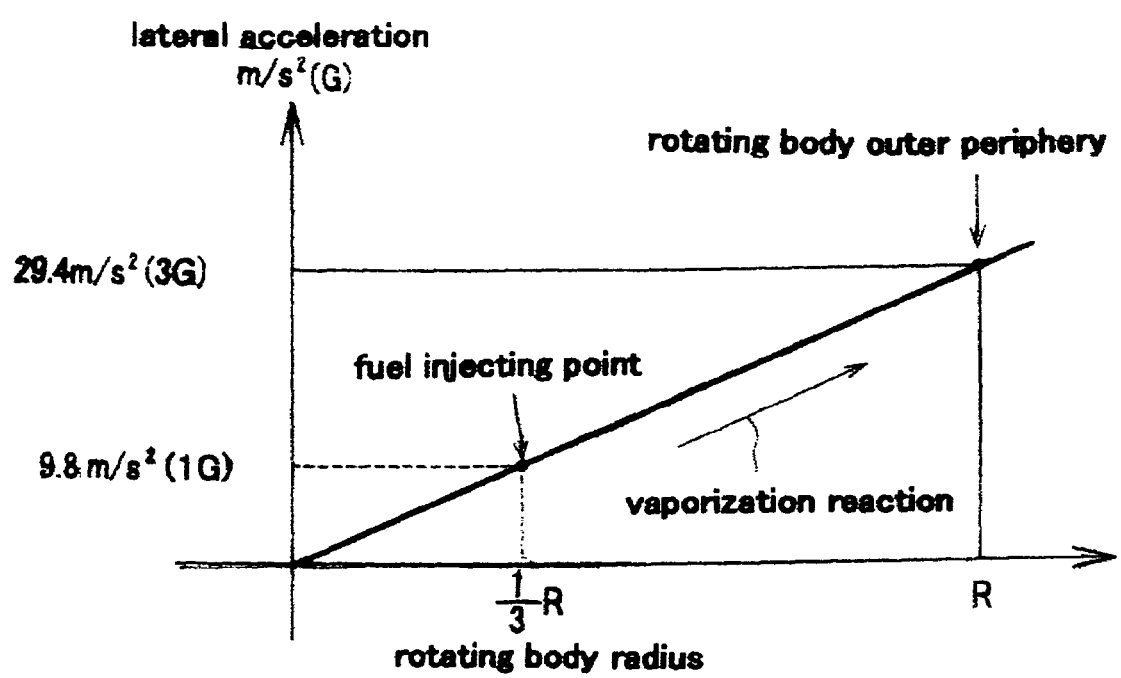
FIG. 2 is a graph showing a relationship between a radial direction position of a rotating disk and a lateral acceleration received by a fuel and by a compound formed by the reaction generating hydrogen, on the rotating disk.

FIG. 1 is a perspective view showing a first embodiment of a hydrogen generating apparatus according to the present invention. FIG. 2 is a graph showing a relationship between a radial direction position of a rotating disk and a lateral acceleration, which is received by a fuel, and a compound produced in the reaction generating hydrogen, on the rotating disk.

Shown in FIG. 1 is a hydrogen generating apparatus 1 in which hydrogen is generated by reacting, in the presence of a solid type catalyst M, water and a liquid type borohydride fuel (hereinafter, it is said merely as "fuel").

The hydrogen generating apparatus 1 comprises mainly a reactor 2 being a hollow case for accommodating the catalyst M, a rotating disk (a rotating body) 3 for fixing the catalyst M, a motor (a rotation driving means) 4 for rotating the rotating disk 3, and a fuel injecting means 5 for blowing the fuel against the catalyst M.

The reactor 2 constitutes mainly a rotating disk receiving portion 21 and a substantial cylindrical-like shape projecting portion 22, which is formed projected toward an outer portion from a center portion of an upper wall 21a of the rotating disk receiving portion 21. The rotating disk receiving portion 21 and the projecting portion are formed as one body to communicate with each other.

A groove portion 21c is formed on a lower wall 21b of the rotating disk receiving portion 21 to expand at a lower portion at an outer peripheral portion thereof. An engaging hole 21d for supporting rotatably a rotating shaft 41 of the motor 4 and for sealing the generated hydrogen is formed on a center of the groove portion 21c.

A deriving tube 21f is formed integrally at an appropriate place of a bottom wall 21e of the groove portion 21c. The deriving tube 21f introduces the compound RC, such as NaBO$_2$ generated by a reaction between water and the fuel in the presence of the catalyst M, and a remaining water being a fuel solvent, etc., after the reaction to a spent fuel tank of a fourth embodiment according to the present invention, described subsequently herein. Further, the projecting portion 22 is an introducing tube in which hydrogen gas generated in the reactor 2 is introduced to a fuel battery (not shown in FIG. 1).

The rotating disk 3 has a substantially circular plate-like shape and at a center thereof the rotating shaft 41 of the motor 4 penetrates through and is fixed to the rotating disk 3. The catalyst M is fixed with a substantial ring shape to an upper face 32 of the rotating disk 3.

The motor 4 is constituted mainly by the rotating shaft 41, which extends to a vicinity of a tip end of the projecting portion 22 from a vicinity of the lower wall 21b of the reactor 2, and a main body portion 42, which rotates the rotating shaft 41. The rotating shaft 41 is supported rotatably by the engaging hole 21d formed on the lower wall 21 of the reactor 2, and by a bearing portion 23 which is fixed to an inner portion of the projecting portion 22. The bearing portion 23 has a filter portion to enable only gaseous material to pass through the bearing portion 23.

The fuel injecting means 5 comprises mainly a fuel tank 51, described subsequently herein, a pressurizing pump 52, an injector 53, piping 54, 55, and a valve 56. The fuel tank 51 is a tank for storing borohydride fuel and is connected to the pressurizing pump 52 through the piping 54. The valve 56 is installed at an appropriate place of the piping 54; and when the valve 56 is opened the fuel is discharged from the fuel tank 51 and when the valve 56 is closed the fuel in not discharged from the fuel tank 51, so that flow of the fuel is controlled.

The pressurizing pump 52 supplies the fuel to the injector 53 by pressurizing the fuel sent from the fuel tank 51 and is connected to the two injectors 53, 53 through the forked branched shape piping 55. Each injector 53 blows the fuel discharged from the pressurizing pump 52 toward the catalyst M. This injector 53 is fixed at an appropriate place of the upper wall 21a of the rotating disk receiving portion 21 to blow the fuel to a place, such a place being distanced by a predetermined distance in a radial direction from the center of the rotating disk 3.

The catalytic reaction of the fuel and water on the rotating disk 3 occurs during flow across an operating distance between the fuel injecting point and an outer periphery of the rotating disk 3, and proceeds with the flow of the fuel, which is generated according to a centrifugal force in this operating distance. The fuel flow is related to the centrifugal force, which is determined according to a radial dimension and a rotating number of the rotating disk 3.

In response to a hydrogen gas generating speed of the catalyst to be applied, the fuel flow is set at an optimum value to totally complete (100%) the reaction in the above operating distance.

For example, when acceleration is 1 G at the injecting point and is 3 G at the outer periphery, and when a distance toward the radial direction from the rotating shaft is R, according to a formula the acceleration G=R$\omega^2$ ($\omega$: angular acceleration), and the above predetermined distance is set to be about one third of a radius of the rotating disk 3.

As shown in FIG. 2, at the fuel injecting point, a small lateral acceleration having nearly 9.8 m/s (1 G) is acted on the fuel and the fuel reacts with water in the presence of the catalyst M under a suitable velocity and product generated by the reaction flows toward an outer portion of the rotating disk 3.

In this time, in addition to the hydrogen gas generation, the compound RC and water such as the fuel solvent, etc. flow; however, the compound RC and water etc. are pushed out to the outer portion due to the centrifugal force.

When the compound RC and water, etc., reach to a vicinity of a peripheral edge of the rotating disk 3, the radial dimension and the angular acceleration of the rotating disk 3 are set to add a high lateral acceleration velocity having more than 29.4 m/s$^2$ (3 G).

As a result, the compound RC and water, etc., separate from the catalyst M and flow out toward the outer portion. The compound RC, etc., that has flowed out toward the outer portion falls into the groove portion 21c and flows into the recovering use tank from the deriving pipe 21f.

As stated above, in the first embodiment according to the present invention following effects will be obtained.

The fuel can flow on the contacting area under a small lateral acceleration at the fuel injecting point and under a comparatively low velocity, and the catalytic reaction time can be achieved. The fuel can spread to a disk shape catalyst face according to the centrifugal force, and then the contacting area between the catalyst M and the fuel is large, and, accordingly, the reaction is promoted.

Further, the compound RC generated together with the hydrogen gas is separated centrifugally according to the above lateral acceleration, which becomes high at the periphery of the rotating disk 3, and then the compound RC is prevented surely from adhering to the catalyst M.

The present invention is not limited to the first embodiment according to the present invention but will be carried out according to the various embodiments. In this first embodiment according to the present invention, the two injectors 53 are provided; however, the present invention is not limited to this structure. For example, according to the supply amount of hydrogen, a number of injectors 53 is increased or decreased.

A modified example of the first embodiment according to the present invention will be explained referring to FIG. 3. The constituting elements similarly to the first embodiment according to the present invention will be indicated with the same reference numerals.

Figure 3:
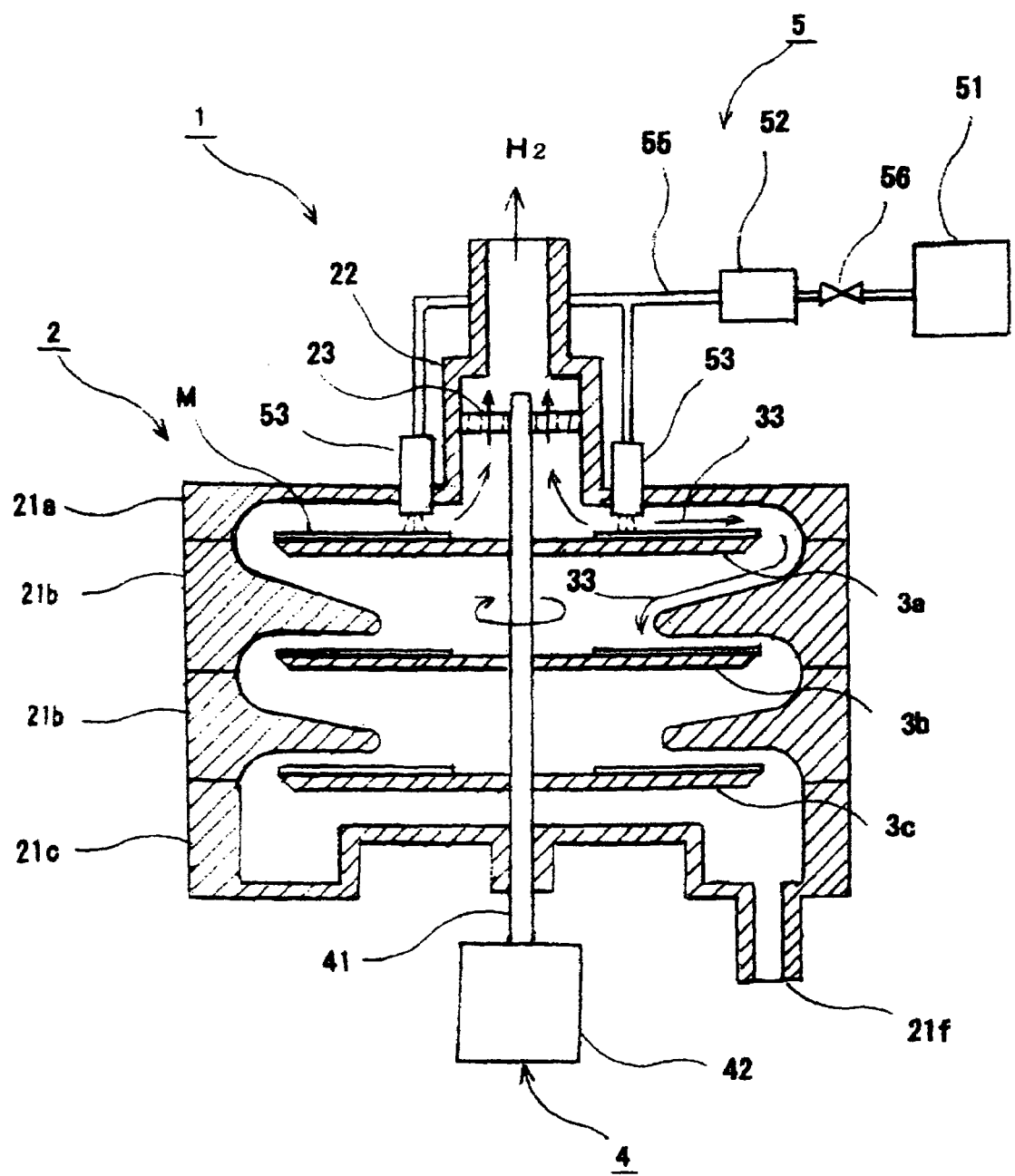
FIG. 3 is a cross-sectional view showing a modified embodiment of a hydrogen generating apparatus according to the present invention.

When a large quantity of hydrogen is to be generated, as shown in a cross-section view shown in FIG. 3 the rotating disk 3 is constituted with plural stages. The fuel flows on the respective rotating disks 3a, 3b, 3c according to the centrifugal force, and the flow of reactant and product formed by the reaction is generated.

Flow passages are constituted to flow the fuel in series on the rotating disk 3 as shown by an arrow mark 33. Accordingly, the distance for performing the catalytic reaction is enlarged, and a large quantity of hydrogen can be generated.

Second Embodiment

Hereafter, a second embodiment of a hydrogen generating apparatus according to the present invention will be explained.

Figure 5:
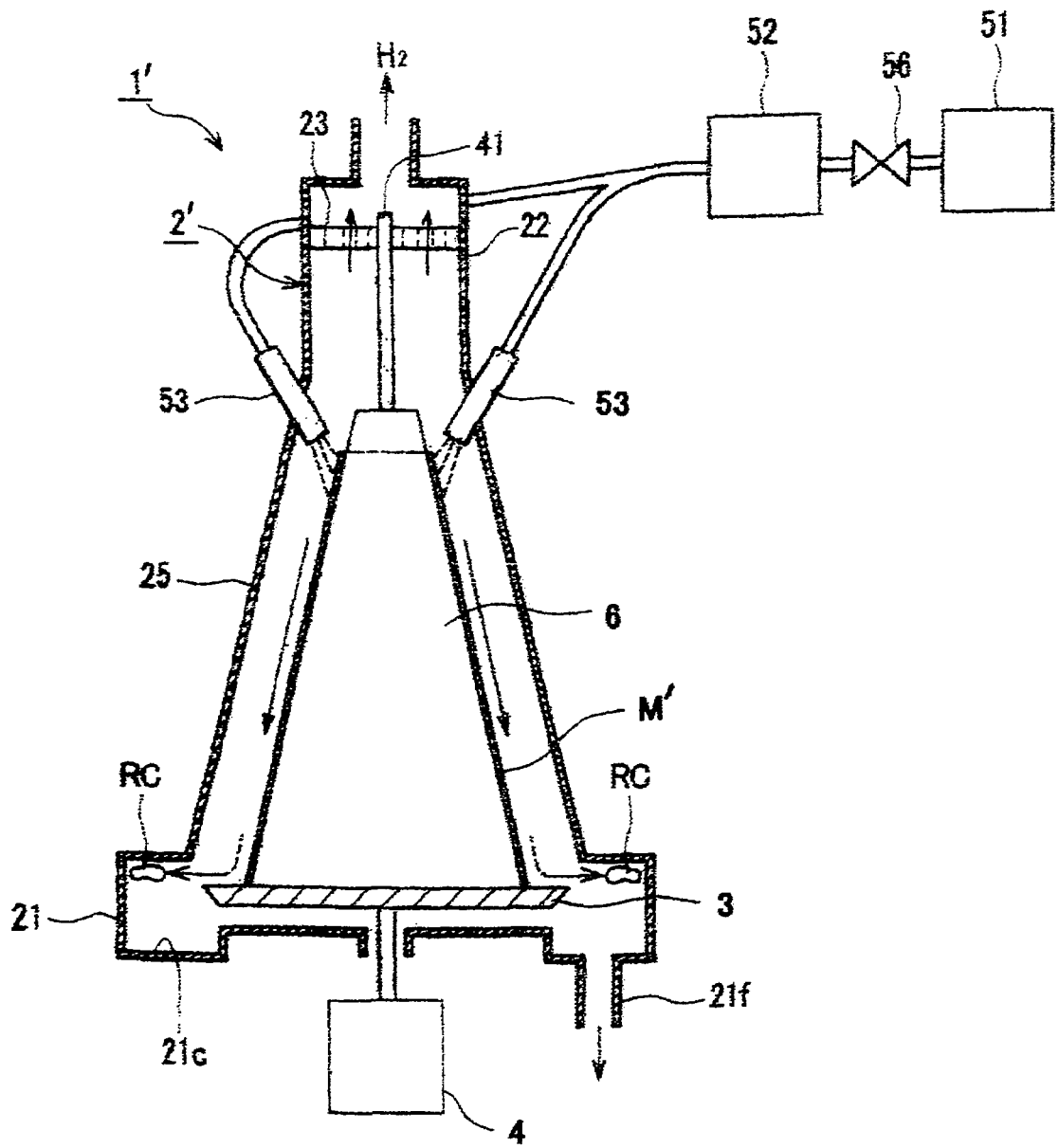
FIG. 5 is a cross-sectional view showing a second embodiment of a hydrogen generating apparatus according to the present invention.

Since this second embodiment is performed according to the alternation of the first embodiment of the hydrogen generating apparatus 1, the constituting elements similar to those of the first embodiment are expressed with the same reference numerals shown in the first embodiment. FIG. 5 is a cross-sectional view showing a second embodiment of a hydrogen generating apparatus according to the present invention.

As shown in FIG. 5, a hydrogen generating apparatus 1' comprises a reactor 2', a cone body (a rotating body) 6, and a catalyst M', which have different structures from those shown in the first embodiment. The reactor 2' has a cone cylindrical portion 25, which is formed as one body between the rotating disk receiving portion 21 and the projecting portion 22.

The cone cylindrical portion 25 is formed with a cylindrical-like shape, in which a diameter thereof becomes larger in a direction toward a lower portion. The two injectors 53, 53 are arranged to direct fuel toward an interior portion at an upper end portion of the cone cylindrical portion 25.

The cone body 6 is formed with a column-like shape (a shape in which a top portion of the cone body is cut off), in which the diameter thereof becomes larger in a direction toward the lower portion. This cone body 6 is joined to the rotating shaft 41 of the motor 4 and a lower face thereof is joined to the rotating disk 3. Further, the catalyst M' is fixed to the cone body 6 to cover an outer peripheral face of the cone body 6. This second embodiment will operate similarly to that of FIG. 1.

As stated above, in this second embodiment according to the present invention, following effects can be obtained. Since the catalyst M' is installed on a whole outer peripheral face of the substantially cone-like shape cone body 6, a surface area of the catalyst M' is formed extremely large, and accordingly the hydrogen generating apparatus 1' is formed with a compact size.

As stated above, the present invention is not limited to the first embodiment and the second embodiment according to the present invention but will be carried out according to the various embodiments.

Further, a fuel supplying control in the first embodiment and in the second embodiment according to the present invention will be explained.

As the means for controlling the amount of the fuel, for example, to supply intermittently the fuel from the injector 53 shown in FIG. 1, against the catalyst M with a predetermined time interval, a controlling means for controlling an opening and closing of an electromagnetic valve in the injector 53 is provided.

Figure 6:
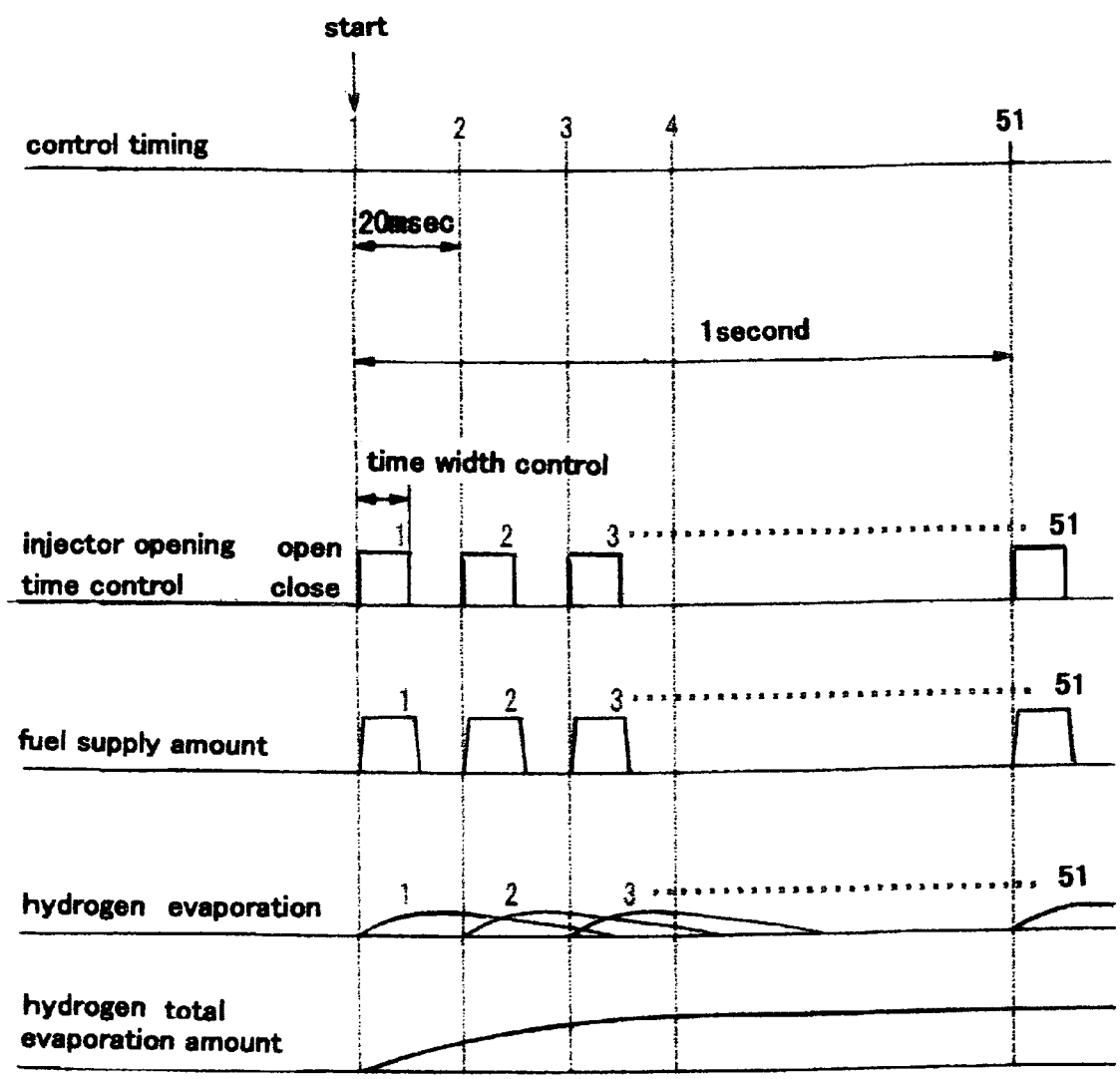
FIG. 6 is a time chart showing one example of a control for supplying intermittently a fuel against a catalyst.

As a controlling method, as shown in FIG. 6, an example will be explained, in which the electromagnetic valve in the injector 53 is opened every 0.02 second (20 msec), i.e., 50 times per one second.

Figure 4:
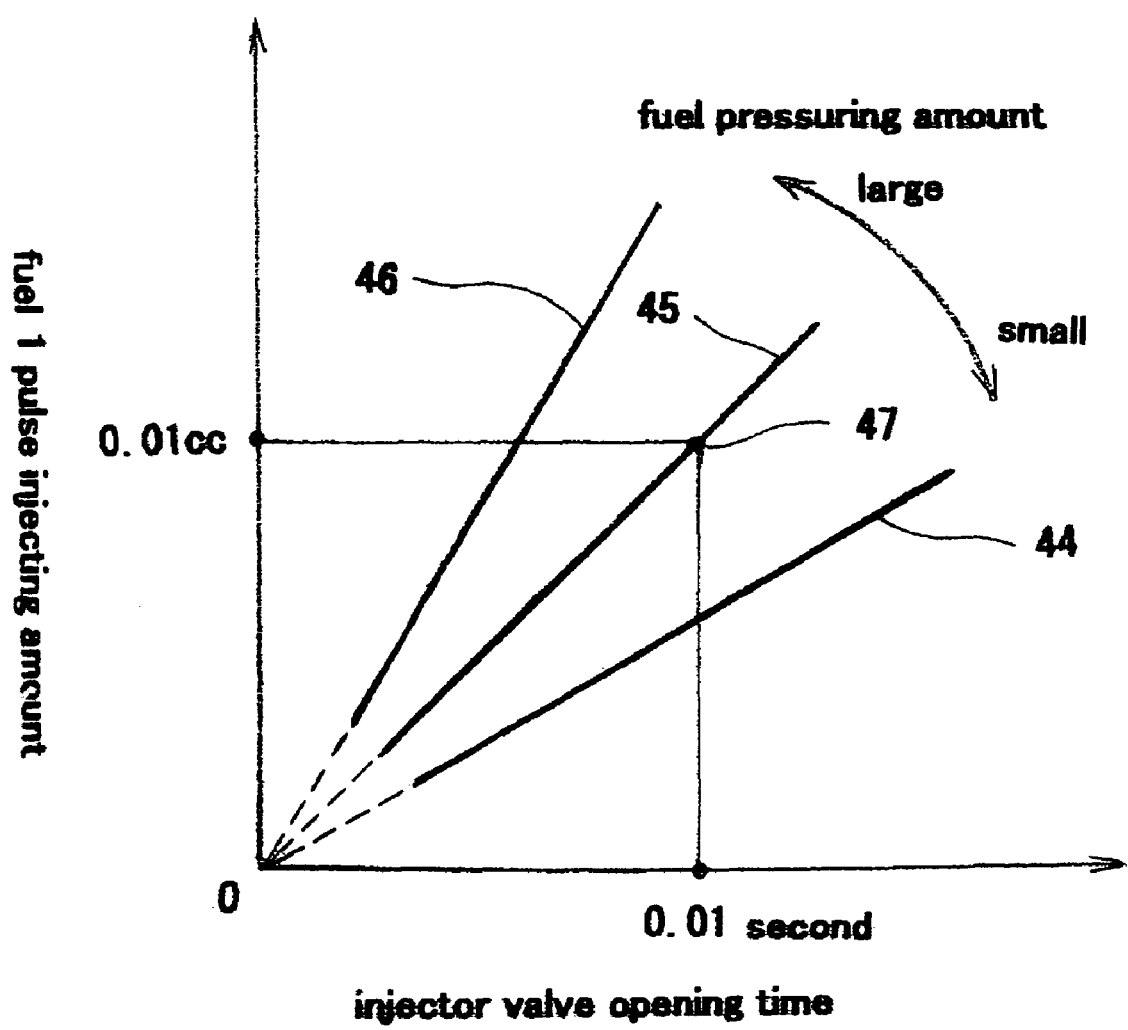
FIG. 4 is a graph showing a relationship between an opening time of a valve of an injector and a fuel injecting amount.

As shown in FIG. 4, relating to an injecting amount of the fuel from the injector 53 in each pulse, when a fuel pressurizing amount forms a parameter, it is presented as characteristics 44, 45, 46 and it has a proportional relationship with the opening time of the respective valves of the injectors.

In this example, when a fuel pressurizing amount has a value at a point 47 shown in FIG. 4, an amount being injected at one time is 0.01 cc and then with fuel injecting pulses at 50 times per one second a total fuel supplying amount is 0.5 cc per one second.

This fuel control system is a system in which the opening time of the valve of the injector is controlled to vary. This injecting control is so called as PWM control (Pulse Width Modulation control), and a pulse width is controlled freely; as a result the injecting amount per unit time is controlled surely with a good responsibility.

In addition to the above, as the controlling method of the fuel, it can realize a system in which a pulse interval (so called, PPM system) is controlled, in which the opening time of the valve of the injector is made constant, and a system (PAM system) for variably controlling an opening degree of the valve of the injector.

Third Embodiment

Hereinafter, a third embodiment of a hydrogen generating apparatus according to the present invention will be explained. In this third embodiment according to the present invention, whole fuel flow passages of the hydrogen generating apparatus according the first embodiment of the present invention is controlled for cleaning; in addition to the cleaning effect of the contacting area according to the above stated centrifugal separation, this third embodiment has a compulsory cycle for cleaning the spent fuel flow passage.

In this third embodiment according to the present invention, the constituting elements similar to those of the first embodiment have the same reference numerals, and explanations thereof will be omitted.

Figure 7:
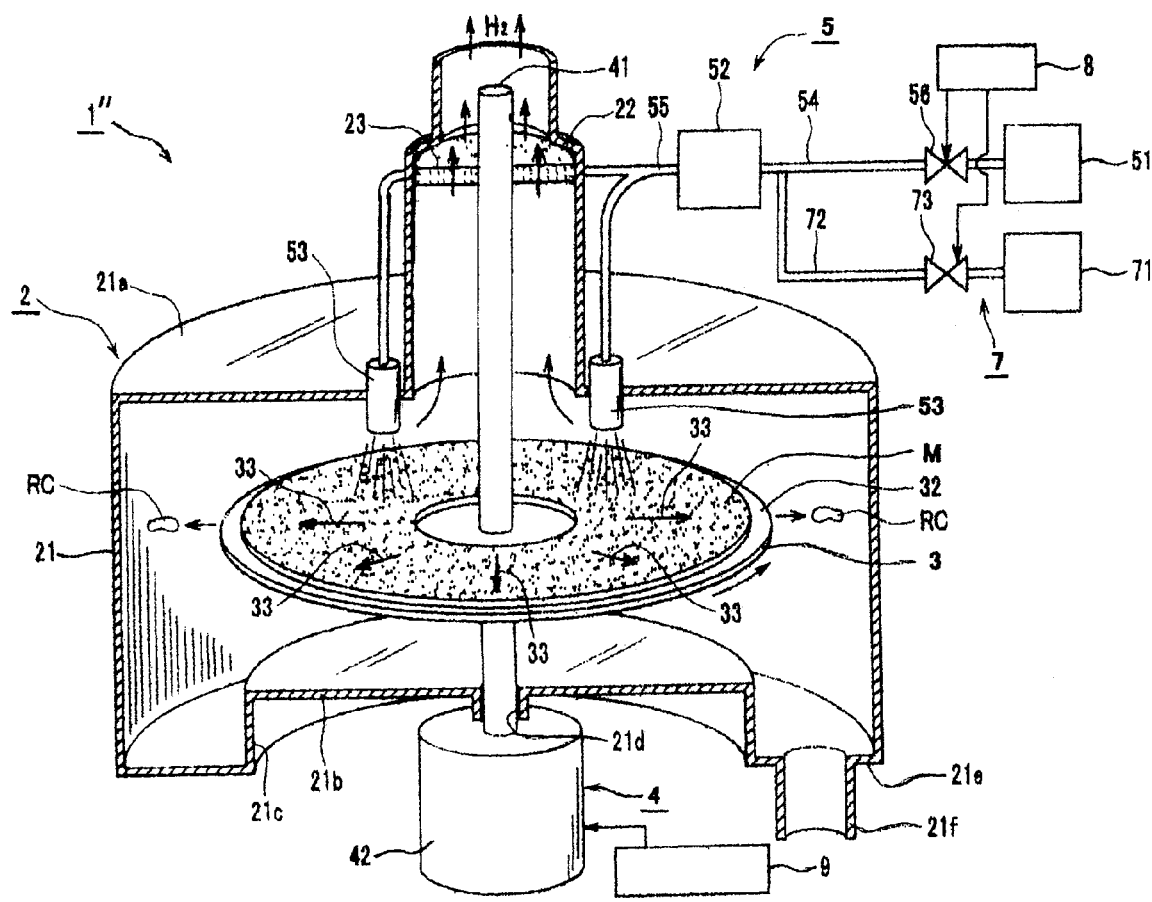
FIG. 7 is a perspective view showing a third embodiment of a hydrogen generating apparatus according to the present invention.
Figure 8:
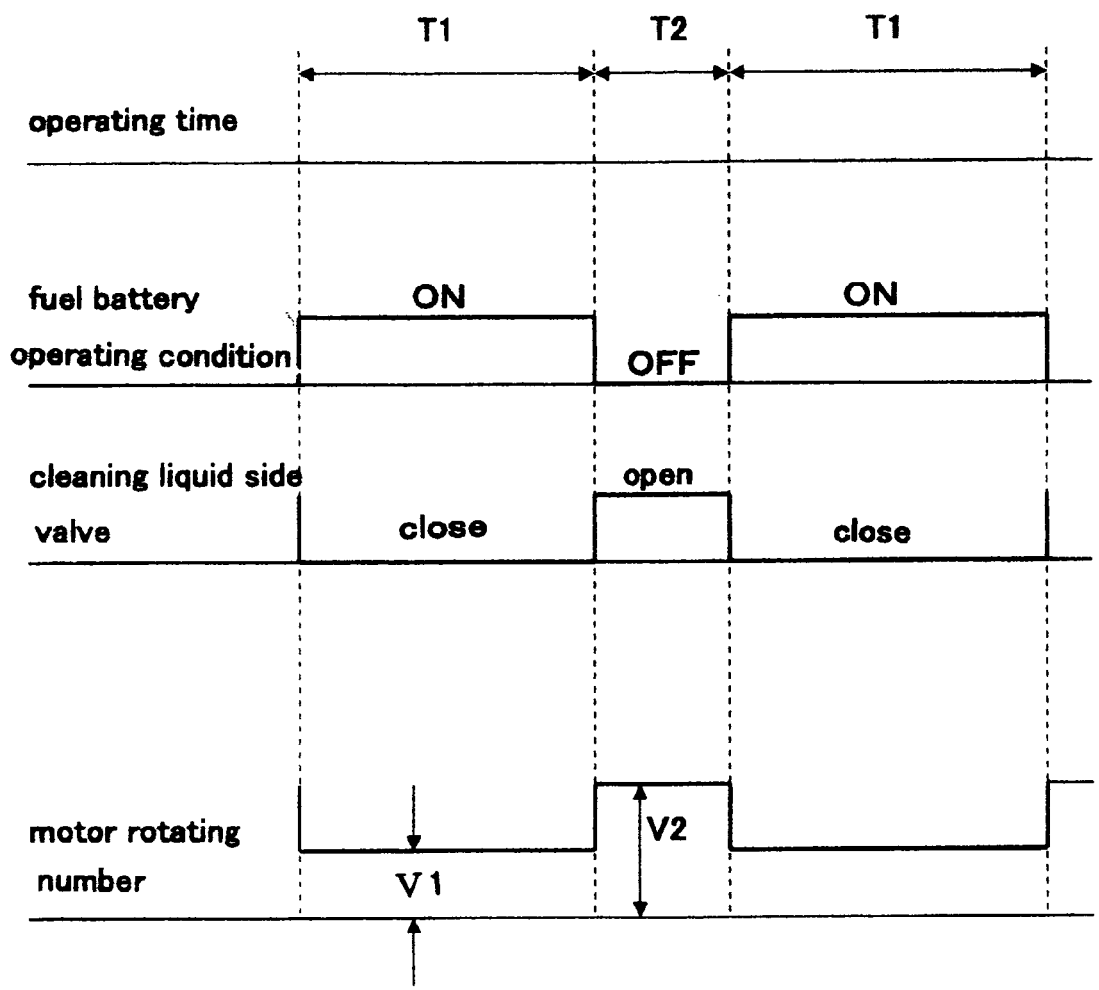
FIG. 8 is a time chart showing operation states of respective valves.

FIG. 7 is a perspective view showing the hydrogen generating apparatus according to the third embodiment according to the present invention, and FIG. 8 is a time chart showing operating conditions of the respective valves shown in FIG. 7.

As shown in FIG. 7, the hydrogen generating apparatus 1" of this third embodiment according to the present invention, in addition to the constituting elements corresponding to those of the first embodiment according to the present invention, comprises a cleaning liquid injecting means 7, a control means 8, and a rotation controlling means 9.

The cleaning liquid injecting means 7 cleans the catalyst M by blowing a cleaning liquid against the catalyst M, the control means 8 controls mainly a changeover of a supply of the fuel and the cleaning liquid, and the rotation controlling means 9 controls a rotational number of the motor 4.

The cleaning liquid injecting means 7 comprises a cleaning liquid tank 71 for storing the cleaning liquid, a piping 72 for connecting the cleaning liquid tank 71 and the pressurizing pump 52, and a valve 73 provided on the piping 72. The cleaning liquid in the cleaning liquid tank 71 is injected toward the catalyst M using the pressuring pump 52 and the injectors 53, 53.

In other words, the cleaning liquid injecting means 7 and the fuel injecting means 5 are constituted as one body by using jointly the pressuring pump 52 and the injectors 53, 53. As the cleaning liquid, water etc., for example, is utilized.

The controlling means 8 controls the respective valves 56, 73 and electromagnetic valves. Namely, the controlling means 8 controls a valve 56 at a side of the fuel tank 51 and the valve 73 at a side of the cleaning liquid tank 71 and blows the cleaning liquid instead of the fuel against the catalyst M.

Concretely, this controlling means 8 controls the respective valves 56 and 73 and the electromagnetic valve to blow the cleaning liquid at a predetermined shot time by closing the valve 56 and by opening the valve 73.

The rotation controlling means 9 controls the motor 4 to make higher the rotational number of the rotating disk 3 when the cleaning liquid is blown against the catalyst M than the rotational number of the rotating disk 3 when the fuel is blown against the catalyst M.

In other words, the rotational number of the motor 4 is controlled to improve a cleaning effect, such that, during the time the cleaning liquid is blown against the catalyst M, since a lateral acceleration G on the rotating disk 3 is proportional to a square of the rotational number, the rotational number of the rotating disk 3 is increased and the lateral acceleration G is increased.

Next, a cleaning method of the catalyst M using the above stated cleaning liquid injecting means 7 will be explained referring to FIG. 7 and FIG. 8.

As shown in FIG. 8, when the fuel battery is made to stop after a lapse with a predetermined time T1 (for example, 10 minutes) the valve 56 is closed according to the controlling means 8 and the valve 23 is opened with a predetermined time T2 (for example, 1-5 seconds). During this predetermined time T2, the motor 4 rotates at the higher rotation number V2 than the rotation number V1 according to the rotation controlling means 9.

Accordingly, the cleaning liquid in the cleaning liquid tank 71 is blown against the catalyst M according to the pressuring pump 52 and the injectors 53, 53, and the cleaning liquid, which has reached to the catalyst M, receives a strong centrifugal force according to the rotating disk 3 which rotates under a high speed and acts to flush out surely the residual compound RC.

For example, when one time cleaning is carried out every 10 minutes and the supplying amount of the cleaning liquid at the one time is 10 cc, since 60 cc cleaning liquid is supplied to the catalyst M during one hour, then the catalyst and the whole fuel flow passages are cleaned effectively.

During the above stated time, the hydrogen supply is made to stop and an electric generating operation of the fuel battery is made to stop, however, the electric power supply to the controlling means 8 and the pressurizing pump 52, etc., is performed by a battery, such as a secondary battery etc., which is connected to a normal fuel battery.

According to the third embodiment of the present invention, the cleaning condition of the whole fuel flow passage can be maintained and the stable hydrogen evaporation is realized.

As stated above, the present invention is not limited to the third embodiment but is applicable to the various embodiments. In this third embodiment, during the operation of the fuel battery system the cleaning is performed one time every predetermined time; however, the present invention is not limited to the above embodiment.

For example, during the stopping time of the fuel battery system, there can be a single cleaning. In this case, the controlling means 8 the rotation controlling means 9 and the pressurizing pump 52 etc. may be operated according to a stopping signal from an outside portion similarly to the third embodiment according to the present invention. Further, when the fuel battery system is stopped during a long period, the system may carry out a periodic automatic cleaning.

In this third embodiment according to the present invention, the cleaning is performed by only the cleaning liquid in the cleaning liquid tank 71. However, the present invention is not limited to this third embodiment; for example, when the cleaning liquid is water, the water generated at a positive pole side of the fuel battery may be reused for the cleaning use.

In this case, a water discharging port for discharging the water of the fuel battery and a water supplying port of the cleaning liquid tank 71 can be connected using a piping. In the above stated structure, a reverse valve for preventing a reversal flow and a pump for sending the water to a side of the cleaning liquid tank 71 are provided suitably.

Fourth Embodiment

Hereinafter, a fourth embodiment of a hydrogen generating apparatus according to the present invention will be explained. A fuel tank construction installed in the hydrogen generating apparatus will be explained referring to a cross-sectional view of a fuel tank shown in FIG. 9.

Figure 9:
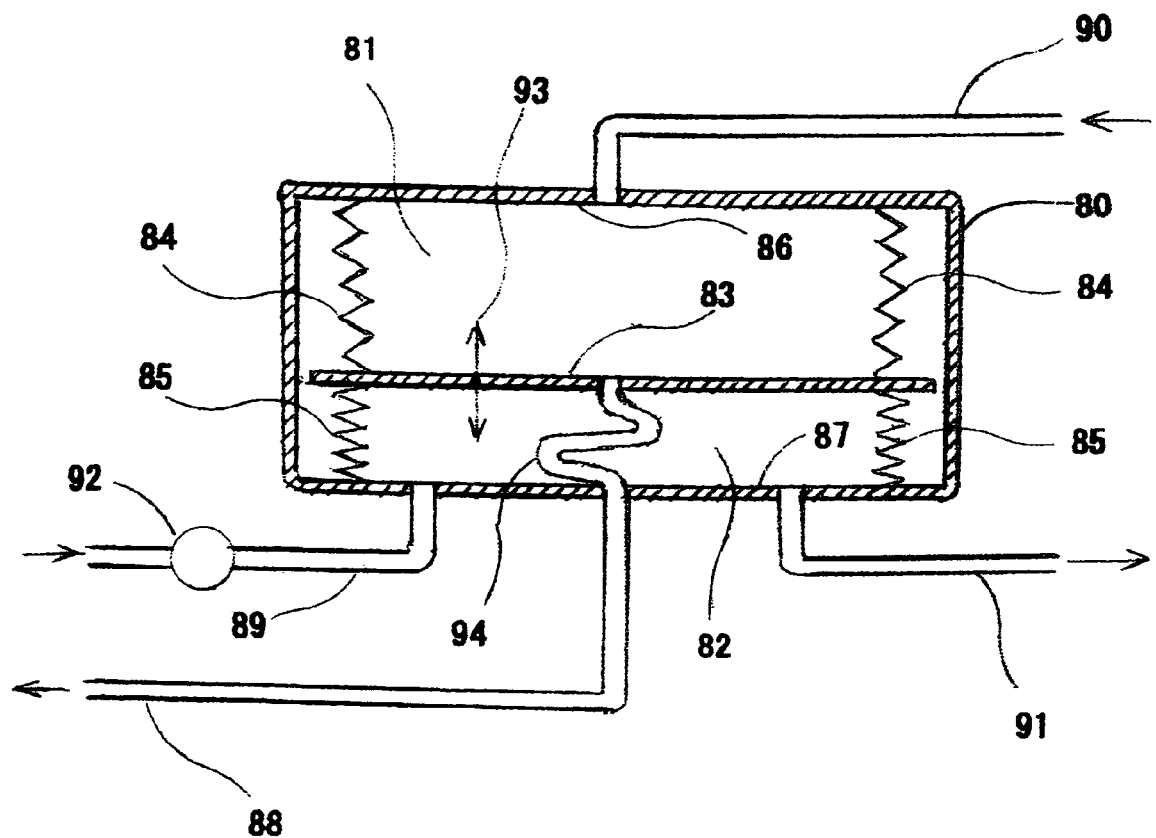
FIG. 9 is a cross-sectional view showing a fourth embodiment of a hydrogen generating apparatus according to the present invention, and showing fore and aft of usage of a fuel tank for connecting the hydrogen generating apparatus.

In FIG. 9, a fuel tank chamber 81 upstream of use and a spent use fuel tank chamber 82 downstream of use are separated by a partitioning wall 83, and these fuel tank chambers 81 and 82 can accommodate totally fuel to be used and reaction products with the minimum capacity in a volume of an integrated tank 80.

The borohydride fuel is, as shown in the above stated reaction formula, $NaBH_4$ solution as the fuel to be used; and with the reaction to generate hydrogen $NaBH_4$ changes to $NaBO_2$ by 1 to 1, and the solution of the spent used fuel is discharged.

The sum of the volume of fuel before use and the volume of the products after use of the fuel is substantially constant. The before use tank chamber 81 for storing the fuel and the spent use tank chamber 82 are separated by the portioning wall 83, and an upper wall 86 of the before use tank chamber 81 and a lower wall 87 of the spent use tank chamber 82 are provided.

Further, the upper wall 86 and the portioning wall 83 are combined with an expandable side wall 84, and also the lower wall 87 and the portioning wall 87 are combined with an expandable side wall 85. Then the integrated tank 80 is constituted having two chambers 81 and 82 and the before use tank chamber 81 and the spent use tank chamber 82 are used under a condition that they are always being filled up, and the tank volume between the upper wall 86 and the lower wall 87 has substantially a same volume, as stated above. Accordingly, the integrated tank 80 can be formed to accommodate the minimum capacity in the volume of the integrated tank 80.

The addition of the fuel to the before use tank chamber 81 is carried out using a pouring piping 90, and the fuel supply is carried out to connect to the valve 56 shown in FIG. 1 via a fuel supplying piping 88 by passing through a bendable piping 94 against the upper and lower movement of the partitioning wall 83.

Further, the spent use fuel is pored into the spent use fuel tank chamber 82 through a recovery fuel pouring piping 89 by passing through a pouring pump 92 from the deriving tube 21*f* shown in FIG. 1. The spent use fuel stored in the spent use fuel tank chamber 82 is discharged from a discharging piping 91 and is recovered outside tank 80.

Since the borohydride fuel is a nonflammable alkali fuel, which can operate under the normal temperature and the normal pressure environment, and since material of which the tank is constructed is a resin system material or a stainless material, accordingly the expandable side walls 84 and 85 are constituted stably.

According to the present invention, since the compound generated by the hydrogen-forming reaction from the fuel, generated together with the hydrogen gas, is centrifugally separated due to the rotating body, the compound can be prevented from adhering to the catalyst.

What is claimed is:
1. A hydrogen generating apparatus comprising:
a reactor;

a fuel tank connected to said reactor, for storing a borohydride fuel;
a rotating body installed in an inner portion of said reactor;
a catalyst fixed to said rotating body and rotated together with said rotating body;
a rotation driving means for rotating said rotating body;
a rotating shaft connected to said rotation driving means, for rotating said rotating body; and
a fuel injecting means for controlling supply of said borohydride fuel and for blowing said borohydride fuel against said catalyst under a rotation state of said rotating body,
whereby said borohydride fuel and water are reacted in the presence of said catalyst, and hydrogen is generated, in accordance with a reaction formula, which is $NaBH_4 + 2H_2O \rightarrow NaBO_4 + 4H_2$.

2. A hydrogen generating apparatus according to claim 1, wherein the hydrogen generating apparatus comprises further
a controlling means for said fuel injecting means; and
said controlling means for said fuel injection means controls to supply intermittingly said borohydride fuel with a predetermined time interval against said catalyst.

3. A hydrogen generating apparatus according to claim 2, wherein
the hydrogen generating apparatus comprises further
a cleaning liquid injecting means; and
said cleaning liquid injecting means blows out a cleaning liquid against said catalyst.

4. A hydrogen generating apparatus according to claim 3, wherein
the hydrogen generating apparatus comprises further
a rotation controlling means;
said rotation controlling means controls said rotation driving means to arise a rotational number of said rotating body during a blowing-out time of said cleaning liquid against said catalyst.

5. A hydrogen generating apparatus according to claim 3, wherein
said cleaning liquid injecting means has a cleaning liquid tank for storing said cleaning liquid; and
the hydrogen generating apparatus further comprises a pressure pump for pressuring said borohydride fuel sent from said fuel tank and for pressuring said cleaning liquid sent from said cleaning liquid tank.

6. A hydrogen generating apparatus according to claim 5, wherein
the hydrogen generating apparatus comprises further
a rotation controlling means;
said rotation controlling means controls said rotation driving means to arise a rotational number of said rotating body during a blowing-out time of said cleaning liquid against said catalyst.

7. A hydrogen generating apparatus according to claim 1, wherein
the hydrogen generating apparatus comprises further
a cleaning liquid injecting means; and
said cleaning liquid injecting means blows out a cleaning liquid against said catalyst.

8. A hydrogen generating apparatus according to claim 7, wherein
said cleaning liquid injecting means has a cleaning liquid tank for storing said cleaning liquid; and
the hydrogen generating apparatus further comprises a pressure pump for pressuring said borohydride fuel sent from said fuel tank and for pressuring said cleaning liquid sent from said cleaning liquid tank.

9. A hydrogen generating apparatus according to claim 1, wherein a borohydride fuel is stored within said fuel tank.

10. A hydrogen generating apparatus according to claim 1, wherein $NaBO_4$ formed in the reaction generating hydrogen is centrifugally separated due to rotation of the rotating body.

11. A hydrogen generating apparatus according to claim 1, wherein said catalyst is a layer of catalyst material fixed to said rotating body.

12. A hydrogen generating apparatus according to claim 1, wherein the rotating body is in the form of a cone, and the catalyst is fixed to an outer peripheral face of said cone.

* * * * *